(No Model.)
M. W. BOVEE.
DEVICE FOR SEPARATING GAS AND OIL FROM WATER.
No. 597,258. Patented Jan. 11, 1898.
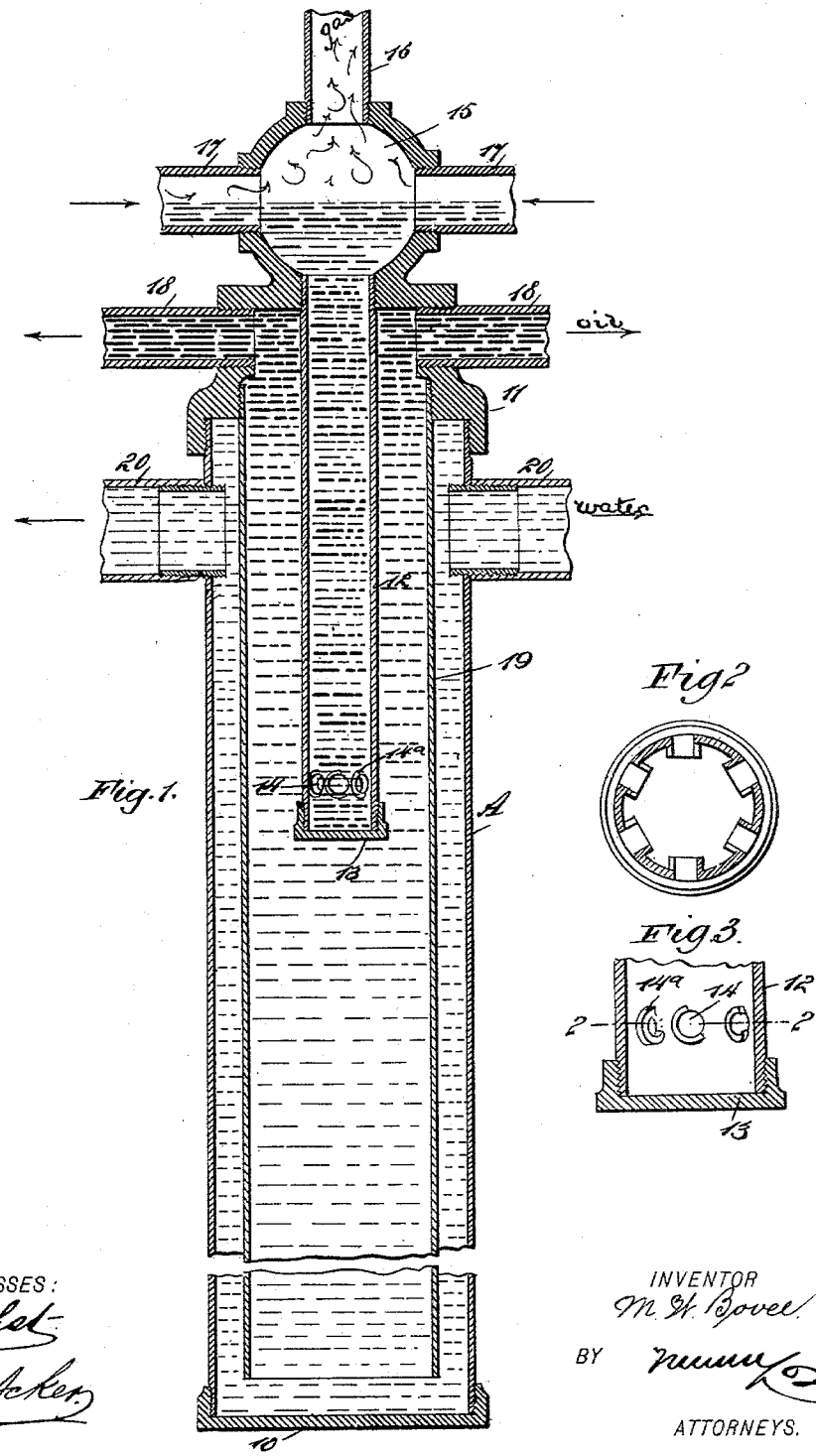
WITNESSES:
INVENTOR
M. W. Bovee
BY
ATTORNEYS.

UNITED STATES PATENT OFFICE.

MANLEY W. BOVEE, OF GOODWILL HILL, PENNSYLVANIA, ASSIGNOR TO HIMSELF, AND EDMUND R. YOUNG, OF TITUSVILLE, LORENZO D. PATTERSON, OF TIDIOUTE, AND FRANK A. WOOD, OF GRAND VALLEY, PENNSYLVANIA.

DEVICE FOR SEPARATING GAS AND OIL FROM WATER.

SPECIFICATION forming part of Letters Patent No. 597,258, dated January 11, 1898.

Application filed February 27, 1897. Serial No. 625,253. (No model.)

*To all whom it may concern:*

Be it known that I, MANLEY W. BOVEE, of Goodwill Hill, in the county of Warren and State of Pennsylvania, have invented a new and Improved Device for Separating Gas and Water from Oil, of which the following is a full, clear, and exact description.

My invention relates to an improvement in devices for separating water and gas from oil.

The object of this invention is to improve upon the construction of a similar device for which Letters Patent were granted to Benton Gilmore, February 11, 1896, No. 554,598, the construction in the improvement being such that the device is very much simplified and rendered much more effective in operation.

A further object of the invention is to provide an efficient means whereby the gas and water may be separated from the oil after the same has issued from the well and before it reaches a tank, thereby saving the expense of small tanks and also preventing a large share of evaporation of oil in warm weather and slush in cold weather, and likewise saving the expense and labor attendant upon the use of steam.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the device. Fig. 2 is a horizontal section through the interior separator, the section being taken at the bottom of the same, as indicated by the line 2 2 of Fig. 3; and Fig. 3 is a vertical section of the lower portion of the interior separator, drawn on an enlarged scale.

A casing A, preferably of cylindrical form, is provided, closed at the bottom by a cap 10, being provided at the top with a second cap 11. The upper cap 11 has an opening in its top portion, in which the upper end of a separating-cylinder 12 is secured, the lower end 13 of said cylinder being closed. Near the lower end of the separating-cylinder 12 apertures 14 are made therein, and each aperture is partially surrounded by a flange 14$^a$, formed upon the inner wall of the cylinder. These flanges tend to give the fluid an upward-revolving motion, effecting a very rapid and effective separation and making it possible to separate a large amount of liquid by the use of a small-sized separator.

The upper cap 11 has a casing formed around the opening in which the upper end of the separator 12 is secured. This casing is usually of circular form in cross-section, and the chamber 15, provided by the casing, is adapted to receive the combined oil, gas, and water as it comes from the well, being introduced into the chamber through pipes 17, and at the top of the chamber 15 a pipe 16 is located, adapted to conduct away the gas from the material supplied to the chamber.

Near the top of the cap 11, below the point where the inner separator 12 is connected therewith, pipes 18 are introduced, through which the oil when separated from the water and the gas flows off to a suitable receptacle, and below the cap 11 in the main casing or cylinder A pipes 20 are introduced, through which the water finds an escape.

The inner casing or cylinder 19 is secured at its upper end to the top cap 11, the inner casing or cylinder 19 being so placed as to surround the inner separator 12, and the inner casing or cylinder 19, which is also a separator, is open at its bottom and extends downward within a short distance of the bottom of the main or outer casing or cylinder A, as shown in Fig. 1.

The liquid received from the well enters the chamber 15, as heretofore stated, and the gas passes off through the top pipe 16. The oil and water finds an escape through the opening 14 in the bottom of the inner separator and enters the outer separator 19, whereupon the oil, being lightest, flows to the top of the said outer separator and passes off through the pipes 18, whereas the water leaves the outer separator at the bottom and passes up between the outer separator and the outer casing A, finding escape through the exit-pipes 20. The outer separator 19 serves to effect a speedy and thorough separation of the oil from the water, and the entire device is simple, durable, and economic in construction.

Having thus described my invention, I claim as new and desire to secure by Letters Patent—

1. A device for separating two liquids of different specific gravity, comprising a chamber having outflow-openings at top and bottom, the lower discharge being against a head a little less than that of the upper, and a supply-pipe projecting axially into said chamber and having discharge-jets at its inner end giving the mixed fluid a rotary motion, substantially as described.

2. A device for separating two liquids of different specific gravity comprising a chamber having outflow-openings at top and bottom, the lower discharge being against a head a little less than that of the upper, a supply-pipe projecting axially into said chamber having discharge-openings at its inner end, and flanges partially surrounding said openings whereby a rotary motion is given to the fluid surrounding the discharge-pipe, substantially as described.

3. A device for separating two liquids of different specific gravity comprising a vertically-disposed separating-chamber having outflow-openings at top and bottom the discharge from the latter being under a head slightly less than the upper, a supply-pipe centrally placed and entering the chamber at its upper end, the lower end of the supply-pipe having discharge-openings circumferentially disposed and flanges inside the pipe partially surrounding said openings whereby the fluid is given a whirling motion in the surrounding chamber, substantially as described.

4. A device for separating two fluids of different specific gravity comprising a vertically-disposed separating-chamber which is open at the bottom and has outflow connections at its top, a chamber surrounding the separating-chamber from the upper end of which the separating-chamber is suspended so as to permit a discharge beneath its lower end, said outer chamber having discharge-outlets slightly below those in the top of the separating-chamber, a supply-pipe suspended from the top within the separating-chamber having discharge-openings circumferentially arranged about its lower end, a gas-separating chamber connected to the upper end of this pipe having supply-pipe connections and having also a gas-conveying pipe connected to its upper part, substantially as described.

MANLEY W. BOVEE.

Witnesses:
EUGENE MACKEY,
JAS. W. YOUNG.